(12) United States Patent
Eickhoff et al.

(10) Patent No.: US 8,057,939 B2
(45) Date of Patent: Nov. 15, 2011

(54) ELECTRICAL POWER GENERATOR

(75) Inventors: Steven J. Eickhoff, Plymouth, MN (US); Roland A. Wood, Bloomington, MN (US); Thomas M. Rezachek, Cottage Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1030 days.

(21) Appl. No.: 11/295,036

(22) Filed: Dec. 6, 2005

(65) Prior Publication Data

US 2007/0124989 A1    Jun. 7, 2007

(51) Int. Cl.
    *H01M 8/06* (2006.01)
(52) U.S. Cl. ........ 429/414; 429/405; 429/408; 429/413; 429/415; 429/417; 429/420; 429/450; 44/301
(58) Field of Classification Search ............. 429/34, 429/17, 19, 414, 405, 408, 413, 415, 417, 429/420, 450; 60/220; 102/284; 44/301; 442/36; 149/6
    See application file for complete search history.

(56) References Cited

U.S. PATENT DOCUMENTS

| | | | |
|---|---|---|---|
| 3,158,994 A * | 12/1964 | Hodgson | 60/220 |
| 3,373,062 A * | 3/1968 | Morris | 149/6 |
| 3,377,955 A | 4/1968 | Hodgson | |
| 3,674,702 A | 7/1972 | MacKenzie et al. | |
| 3,995,559 A * | 12/1976 | Bice et al. | 102/284 |
| 4,155,712 A | 5/1979 | Taschek | 422/239 |
| 4,261,955 A | 4/1981 | Bailey, Jr. et al. | 422/239 |
| 5,372,617 A | 12/1994 | Kerrebrock et al. | 48/61 |
| 5,817,157 A | 10/1998 | Checketts | |
| 6,093,501 A | 7/2000 | Werth | 429/17 |
| 6,432,566 B1 | 8/2002 | Condit et al. | 429/17 |
| 2004/0023087 A1 * | 2/2004 | Redmond | 429/19 |
| 2004/0161646 A1 | 8/2004 | Rezachek et al. | |
| 2004/0214056 A1 * | 10/2004 | Gore | 429/20 |
| 2004/0214489 A1 * | 10/2004 | Porter | 442/36 |
| 2004/0229101 A1 * | 11/2004 | Davis | 429/34 |
| 2008/0286621 A1 * | 11/2008 | Rosenzweig et al. | 429/17 |

FOREIGN PATENT DOCUMENTS

| | | | |
|---|---|---|---|
| WO | WO2004075375 | * | 9/2004 |
| WO | WO 2004075375 | * | 9/2004 |

OTHER PUBLICATIONS

Heung, L. K., et al., "Silica embedded metal hydrides", *Journal of Alloys and Compounds, Elsevier Sequoia, Lausanne, CH,* (Dec. 20, 1999),293-295.

(Continued)

*Primary Examiner* — Michael Marcheschi
*Assistant Examiner* — Chantel Graham
(74) *Attorney, Agent, or Firm* — Schwegman, Lundberg & Woessner, P.A.

(57) ABSTRACT

Electrical power generators incorporating stabilized fuels and methods for the encapsulation of fuels are provided. More particularly, methods for the passivation or encapsulation of water reactive, hydrogen gas generating fuels. The electrical power generators employ water reactive fuels encapsulated in a water vapor permeable, liquid water impermeable membrane, or coated with a water vapor permeable, liquid water impermeable substance to control the quantity of water that is permitted reach the chemical fuel. In the event of damage, electrical power generators incorporating the fuels of the invention are protected from explosions that might otherwise result from rapid, uncontrolled hydrogen generation.

13 Claims, 3 Drawing Sheets

OTHER PUBLICATIONS

"Chinese Application No. 200680052365.2, Office Action Mailed Dec. 25, 2009", 22 pgs.

"European Application Serial No. 06838666.3, Office Action mailed May 31, 2010", 7 pgs.

"Chinese Application No. 200680052365.2, Response filed May 10, 2010 to Office Action mailed Dec. 25, 2009", (w/ English Translation of Amended Claims), 20 pgs.

"European Application Serial No. 06838666.3, Response filed Jul. 22, 2010 to Communication dated May 31, 2010", 7 pgs.

"Chinese Application Serial No. 200680052365.2, Office Action mailed Jun. 23, 2011", (w/ English Translation), 22 pgs.

"Chinese Application Serial No. 200680052365.2, Response filed Aug. 29, 2011 to Office Action mailed Jun. 23, 2011", (w/ English Translation of Amended Claims), 11 pgs.

* cited by examiner

ELECTRICAL POWER GENERATOR

GOVERNMENT RIGHTS

This invention was made with Government support under Contract Number F33615-01-C-2171 awarded by AMPGEN, AFRL Wright Research Lab. The United States Government has certain rights in the invention.

BACKGROUND OF THE INVENTION

1. Field of the Invention

The invention relates to stabilized, encapsulated fuels and methods for the encapsulation of fuels. More particularly, the invention relates to the encapsulation of water reactive, hydrogen gas generating fuels.

2. Description of the Related Art

Similar to batteries, fuel cells function to produce electricity through chemical reactions. Rather than storing reactants as batteries do, fuel cells are operated by continuously supplying reactants to the cell. In a typical fuel cell, hydrogen gas acts as one reactant and oxygen as the other, with the two reacting at electrodes to form water molecules and releasing energy in the form of direct current electricity. This direct current electricity may then be converted into an alternating current. The apparatus and process may produce electricity continuously as long as hydrogen and oxygen are provided. While oxygen may either be stored or provided from the air, it is generally necessary to generate hydrogen gas from other compounds through controlled chemical reactions rather than storing hydrogen, because storing hydrogen gas requires that it either be compressed or cryogenically cooled. As fuel cell technology evolves, so do the means by which hydrogen gas is generated for application with fuel cells.

Currently, there are various methods which are known and employed for generating hydrogen gas. One method is by a process known as reformation in which fossil fuels are broken down into their hydrogen and carbon products. However, this system is undesirable in the long term because it is dependent upon a non-renewable resource. Another means of generating hydrogen gas is by reversibly adsorbing and releasing hydrogen gas from metal hydrides or alloys through heating. While this method is useful, it is not preferred because the metal hydrides are typically very heavy, expensive and only release small quantities of hydrogen. Yet another means by which hydrogen gas is generated is through reactive chemical hydrides. This process involves chemically generating hydrogen gas from dry, highly reactive solids by reacting them with liquid water or acids. Chemicals especially suitable for this process are lithium hydride, calcium hydride, lithium aluminum hydride, sodium borohydride and combinations thereof, each of which is capable of releasing plentiful quantities of hydrogen. Compared to the above methods, the use of reactive chemical hydrides is highly desirable in the art, particularly for generating power for use by small, portable electronic devices, such as cellular phones. However, it also has its disadvantages. For example, it has been found that the reaction products from the chemical hydride and liquid water typically form a cake or pasty substance which interferes with further reaction of the reactive chemical with the liquid water or acid. Furthermore, the reaction of chemical hydrides with liquid are difficult to control, and typically generally results in the production of much more hydrogen gas than needed to power such small electronic devices.

In order to combat this problem, methods have been introduced wherein a hydrogen fuel can be reacted with only gaseous water vapor, instead of liquid water. For example, U.S. Pat. No. 4,155,712 teaches an apparatus for generating hydrogen by the reaction of a metal hydride with water vapor, wherein a water reservoir is provided and the metal hydride is housed in a separate fuel chamber. A liquid water source is provided in a water chamber, and water molecules from the liquid water source are introduced into the fuel chamber by diffusing through a porous membrane. U.S. Pat. No. 4,261,955 also teaches an apparatus for generating gas by the reaction of a metal hydride fuel with water vapor, wherein water vapor from a liquid water reservoir is introduced into a fuel chamber through a pair of spaced porous hydrophobic membranes. In each of these designs, an elaborate power generator system is required in order to regulate the quantity of water vapor that reacts with the chemical fuel and to regulate the reaction rate of water vapor with the chemical fuel.

It would be desirable in the art to provide a method in which the rate of reaction between water molecules and a water reactive chemical fuel can be regulated independently of the apparatus containing the chemical fuel. Further, it has been discovered that hydrogen gas generators that operate based on reactions between a chemical hydride and water can explode or generate hydrogen at an excessive rate if they are damaged and the chemical hydride is exposed to liquid water. Accordingly, it would be further desirable in the art to provide a secure fuel system for a hydrogen gas generator wherein the hydrogen generation rate is limited such that the generator will not explode or rapidly generate hydrogen gas if the generator is damaged.

The present invention provides a solution for this need in the art. The invention provides a stabilized, or passivated, chemical hydride which is encapsulated in a water vapor permeable, liquid water impermeable material, such as Gore-Tex®. Alternately, the chemical hydride may be coated with an oil or rubber substance to passivate the surface of the chemical fuel and prevent liquid water permeation while allowing water vapor permeation.

SUMMARY OF THE INVENTION

The invention provides an encapsulated fuel comprising a solid, water reactive fuel which fuel is encapsulated by a water vapor permeable, liquid water impermeable material.

The invention also provides a process for producing an encapsulated fuel comprising substantially encapsulating a solid, water reactive fuel with a water vapor permeable, liquid water impermeable material.

The invention further provides a power generator apparatus comprising a fuel chamber, which fuel chamber contains an encapsulated fuel comprising a solid, water reactive fuel which fuel is encapsulated by a water vapor permeable, liquid water impermeable material.

The invention still further provides an electrical power generator comprising:

a) a housing;

b) at least one fuel cell mounted within the housing, the fuel cell comprising a cathode, an anode and a water vapor permeable electrolytic membrane positioned between the cathode and the anode; which fuel cell is capable of generating electricity and fuel cell water at the cathode by the reaction of hydrogen gas and oxygen gas;

c) at least one fuel chamber mounted within the housing, which fuel chamber contains an encapsulated fuel comprising a solid, water reactive fuel which fuel is encapsulated by a water vapor permeable, liquid water impermeable material;

d) at least one air inlet for admitting atmospheric air into the housing;

e) a water retention zone within the housing extending from the air inlet to the fuel cell cathode, which water retention zone deters the diffusion of generated fuel cell water out of the air inlet; and f) a cavity within the housing extending from the fuel cell to the fuel chamber, which admits a flow of hydrogen gas from the fuel chamber to the fuel cell, and which admits a flow of water vapor from the fuel cell to the fuel chamber.

DETAILED DESCRIPTION OF THE INVENTION

Figure 1:
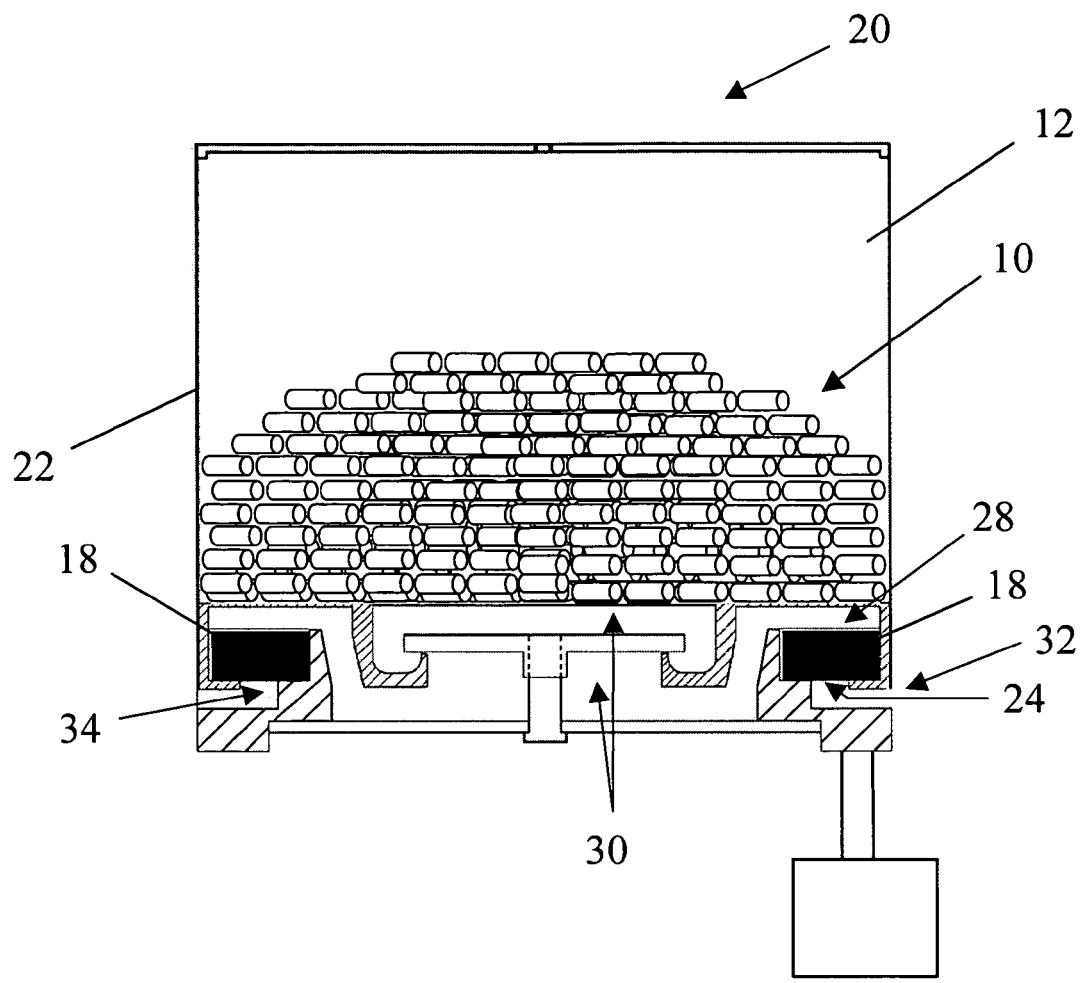
FIG. 1 illustrates a cross-sectional schematic representation of a power generator including encapsulated fuel pellets of the invention.

A stabilized fuel system for use in a hydrogen generating device is provided. The stabilized fuel system comprises an encapsulated fuel 10 which is encapsulated by a water vapor permeable, liquid water impermeable material. As used herein, the term "encapsulated fuel" defines a fuel 14 which is enclosed by a protective coating or membrane 16. The fuels of the invention are particularly useful in hydrogen gas generating power generators that incorporate one or more fuel cells. See, for example, FIG. 1 which illustrates a cross-sectional view of a preferred power generator 20 that incorporates the encapsulated fuels 10 of the invention. Reaction of the fuel substance 14 with water vapor produces hydrogen gas that is used by the fuel cells 18 of a power generator 20 to generate electricity.

As seen in FIG. 1, a preferred power generator 20 includes a generator housing 22, a fuel chamber 12 within the housing 22, which fuel chamber 12 holds the encapsulated fuels 10; at least one fuel cell 18 mounted within the housing 22; and a cavity 30 within the housing 22 extending from the at least one fuel cell 18 to the fuel chamber 12. Cavity 30 admits a flow of hydrogen gas from the fuel chamber 12 to the fuel cell 18, and admits a flow of water vapor from the fuel cell 18 to the fuel chamber 12. Fuel cell 18 generates electricity and fuel cell water from the reaction of hydrogen gas and oxygen gas, e.g. oxygen from the air. In the embodiment of FIG. 1, atmospheric oxygen enters into the housing 22 through at least one air inlet 32. The oxygen gas then travels to the fuel cell 18 where it reacts with hydrogen gas, generating electricity and water molecules. The type of fuel cell exemplified herein is well known in the art and is referred to in the art as a Proton Exchange Membrane (PEM) fuel cell, also known as a Polymer Electrolyte Membrane.

Figure 4:
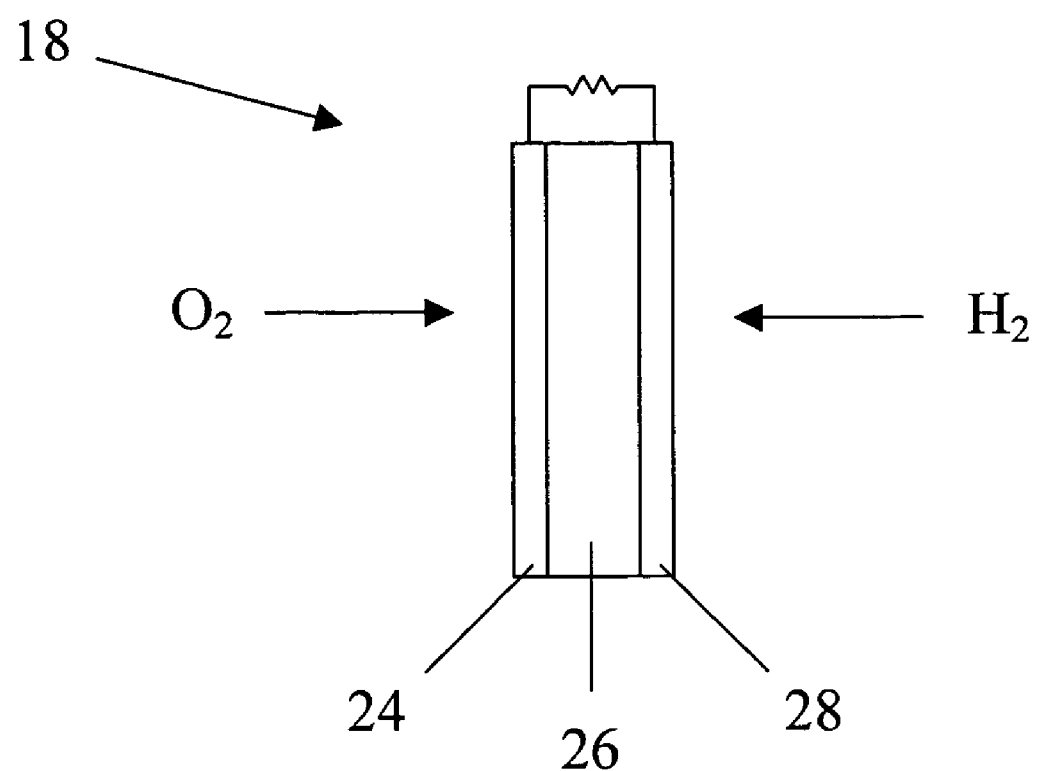
FIG. 4 is a schematic representation of a fuel cell.

As seen in FIG. 4, a typical PEM fuel cell comprises an electrolytic membrane 26 positioned between a negatively charged electrode, or cathode 24, on one side of the membrane, and a positively charged electrode, or anode 28, on the other side of the membrane. In typical hydrogen-oxygen PEM fuel cell behavior, a hydrogen fuel (e.g. hydrogen gas) is channeled through flow field plates to the anode, while oxygen is channeled to the cathode of the fuel cell. At the anode, the hydrogen is split into positive hydrogen ions (protons) and negatively charged electrons. The electrolytic membrane allows only the positively charged ions to pass through it to the cathode. The negatively charged electrons must instead travel along an external circuit to the cathode, creating an electrical current. At the cathode, the electrons and positively charged hydrogen ions combine with oxygen to form water molecules.

While the encapsulated fuels 10 of the invention are suitable for use with any type of power generator design that utilizes hydrogen-oxygen fuel cells, the power generator illustrated in FIG. 1 is a particularly preferred "waterless" power generator embodiment that is capable of producing hydrogen gas and electricity without an independent water supply. Inside the generator, on the anode 28 side of the fuel cell, an initial flush of hydrogen gas is preferably provided to remove residual air from within the power generator. This initial flush of hydrogen gas serves a dual purpose, as it will also react with atmospheric oxygen at the fuel cell, generating an initial amount of electrical energy and generating an initial amount of fuel cell water at the fuel cell cathode 24. This initial amount of fuel cell water is then reclaimed and reacted with the fuel substance 14. Alternately, hydrogen generation may be initiated by the permeation of water molecules from the humidity of the atmosphere outside the power generator, through the air inlet 32, and into the power generator. Although less preferred, it is also possible to add an initial amount of non-fuel cell water to the generator, in an amount substantially less than the amount of fuel cell water generated by the fuel cell, to react with the fuel substance 14 and initiate hydrogen gas generation. Such start-up water may be added to the generator, for example, through an opening in the fuel chamber 12, or through another suitable means, such as through air inlet 32. However, the preferred process and apparatus utilizing the encapsulated fuels 10 of the invention are designed to operate without an externally provided water supply, i.e. the system is water-less except for water that is generated by the fuel cell and water molecules present in the atmosphere outside of the power generator. There is no incorporated or connected water supply, such as a water chamber or water reservoir, to provide water for reaction with the hydrogen fuel substance. This results in a significant improvement in the energy density and specific energy of the power generator compared to conventional systems. Accordingly, it is a continuous, self-regulating process since the hydrogen-oxygen reaction produces exactly the required water corresponding to the electrical power generated, wherein stoichiometric amounts of recycled water and solid fuel are used.

The preferred power generator 20 is also preferably passive, running without actively controlled valves or pumps. More particularly, once water is formed as a by-product of the oxygen-hydrogen reaction at the fuel cell 18, the produced water passively diffuses back through the fuel cell 18, into the cavity 30 and to the fuel chamber 12. This passive diffusion is enabled in part due to one or more water retention zones 34, and in part due to the low humidity inside the cavity 30. Water retention zone 34 comprises the channel extending from the air inlet 32 to each the fuel cell cathode 24. A water retention zone 34 is present at each fuel cell 18 which generates fuel cell water. Due to the geometry of the water retention zone 34, diffusive water loss of fuel cell generated water molecules out of the air inlet is deterred, thereby maintaining a high concentration of water vapor at the fuel cell cathode 24. Instead of losing water molecules to the ambient air, water retention zone 34 causes generated water molecules to accumulate at the cathode 24, creating a region of high humidity between the cathode 24 and air inlet 32.

During operation of the power generator, more generated water vapor will diffuse back into the cavity than is lost out of the air inlet. Furthermore, fuel cell output is directly dependent on the flow of oxygen and hydrogen reactants to the fuel cells, and hence the flow of water vapor the fuel chamber. Accordingly, fuel cell output is proportional to the ratio of the area of the water retention zone to its length. Preferably, the ratio of zone area to zone length per unit of power is from about 0.01 cm/mW to about 0.05 cm/mW of power output for a single fuel cell. If multiple fuel cells are incorporated, this ratio of zone area to zone length per unit of power is divided by the number of fuel cells which share the reactants. The preferred dimensions of the component parts of the power generator 20 are preferably very small in scale, but may also vary with respect to the use of the power generator 20. The power generator of the invention is particularly useful as a micro-power generator for powering miniature devices such as wireless sensors, cellular phones or other hand held electronic devices that are electrically connected to the anode and cathode of the one or more fuel cells.

In the preferred embodiments of the invention, the fuel substance 14 preferably comprises a non-fluid, hygroscopic, porous material in powder, granule or pellet form that allows for the diffusion of gases and vapors. Preferred materials non-exclusively include alkali metals, calcium hydride, lithium hydride, lithium aluminum hydride, lithium borohydride, sodium borohydride and combinations thereof. Suitable alkali metals non-exclusively include lithium, sodium and potassium. The preferred material for the fuel substance 14 is lithium aluminum hydride. As is well known in the art, when contacted with water molecules, these fuel substances react, releasing hydrogen gas. The fuel substance 14 may optionally be combined with a hydrogen generation catalyst to catalyze the reaction of the water vapor and the non-fluid substance. Suitable catalysts are well known and include cobalt, nickel, ruthenium, magnesium and alloys and combinations thereof.

Figure 2:
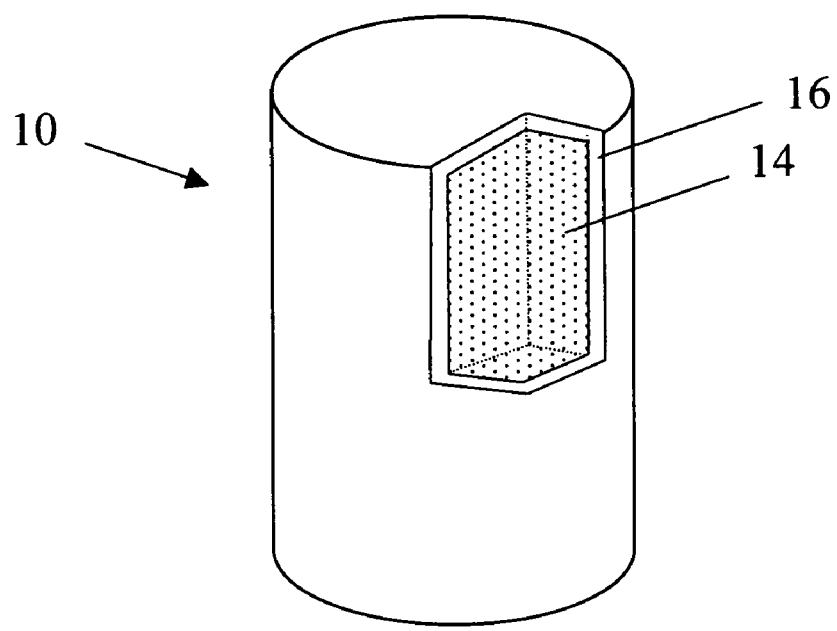
FIG. 2 illustrates a schematic representation of an encapsulated fuel pellet of the invention, including a cut out portion showing a layer of water vapor permeable, liquid water impermeable material surrounding a fuel substance.
Figure 3:
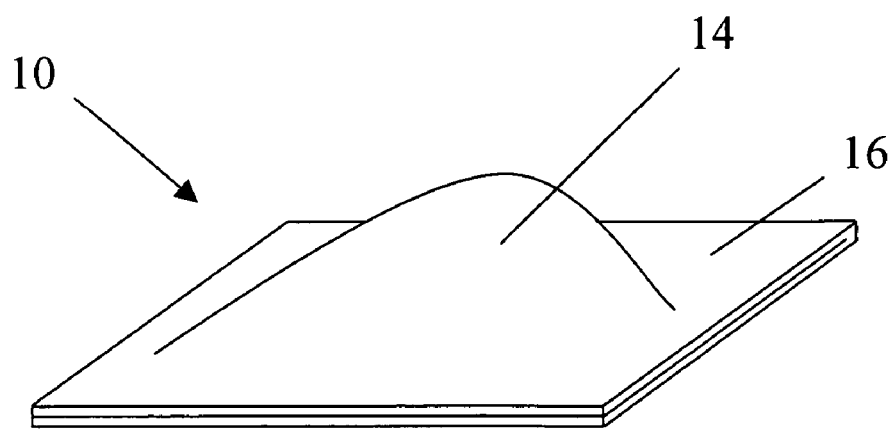
FIG. 3 illustrates a schematic representation of an encapsulated fuel of the invention, wherein a layer of a water vapor permeable, liquid water impermeable material is wrapped around a fuel substance.

FIG. 2 illustrates a schematic representation of an encapsulated fuel pellet 10 encapsulated with a water vapor permeable, liquid water impermeable coating 16. In general, the water vapor permeable, liquid water impermeable material 16 may comprise any material having such properties, and includes porous polymer films and fabrics, as well as oils and rubbers. The fuels 14 may be encapsulated using any suitable method which would be appropriate for the chosen encapsulation material, such as wrapping, coating and the like using conventional, well known techniques. FIG. 3 provides a schematic representation of an encapsulated fuel 10 of the invention wherein a layer of a water vapor permeable, liquid water impermeable material 16 is wrapped around the fuel substance 14.

In a preferred embodiment of the invention, the water vapor permeable, liquid water impermeable material 16 comprises a micro-porous polymeric film. Preferred polymeric films non-exclusively include mono- and multilayer fluoropolymer containing materials, a polyurethane containing materials, polyester containing materials or polypropylene containing materials. Suitable fluoropolymer containing materials include polytetrafluoroethylene (PTFE) polymers, expanded polytetrafluoroethylene (ePTFE) polymers, perfluoroalkoxy polymers (PFA) and fluorinated ethylene-propylene (FEP) polymers. Particularly preferred fluoropolymer containing materials are films and fabrics commercially available under the Gore-Tex®, eVent® and HyVent® trademarks. Gore-Tex® is an e-PTFE material commercially available from W.L. Gore and Associates of Newark, Del., and eVENT® is a PTFE material manufactured by BHA technologies of Delaware. HyVent® is polyurethane containing material commercially available from The North Face Apparel Corp., of Wilmington, Del. Of these, ePTFE GORE-TEX® materials are preferred.

Each of these materials may be in the form of single or multilayer films or fabrics, or as coatings, and are known as waterproof, breathable materials. Breathable membranes are typically constructed from a micro-porous layer of expanded PTFE, polyurethane or polypropylene that is laminated to the face of a film such as nylon or polyester. Breathable coatings are typically formed by spreading a thin layer of a micro-porous or hydrophobic polymer directly on the surface of a material, such as the solid fuels of the invention. Breathability is generally measured in two ways. In one method, the water vapor transmission rate of a material may be tested as a rating in grams of how much vapor a square meter, or alternately 100 $in^2$, of fabric will allow to pass through in 24 hours ($g/m^2/24$ hours or $g/100$ $in^2/24$ hours). Conventional testing methods include the procedures set forth in ASTM E-96 Method B and the procedures set forth in ASTM F1249. The second method is known as Evaporative Resistance of a Textile (RET). The lower the RET, the higher the breathability, i.e. the greater the amount of moisture that will pass through. For the purposes of this invention, the preferred films or fabrics of the invention have a breathability as determined by the ASTM E-96 Method B test of from about 100 $g/m^2/24$ h to about 10,000 $g/m^2/24$ h, more preferably from about 500 $g/m^2/24$ h to about 2000 $g/m^2/24$ h and most preferably from about 700 $g/m^2/24$ h to about 1200 $g/m^2/24$ h. The micro-porous materials generally have a pore size of from about 0.001 μm to about 1 μm in diameter, and a thickness of from about 0.1 μm to about 100 μm. The porosity and thickness of the materials can be tailored to give a desired water vapor flux, while preventing liquid water penetration. In the preferred embodiment of the invention, the preferred films or fabrics have a pore size of from about 0.001 μm to about 1 μm, more preferably from about 0.01 μm to about 0.5 μm, and most preferably from about 0.05 μm to about 0.1 μm. Further, in the preferred embodiment of the invention, the preferred films or fabrics have a thickness of from about 0.1 μm to about 100 μm, more preferably from about 0.5 μm to about 10 μm, and most preferably from about 1 μm to about 5 μm.

In another preferred embodiment of the invention, the water vapor permeable, liquid water impermeable material 16 comprises a micro-porous oil or rubber coating. Preferred oils non-exclusively include mineral oil, petroleum based oils consisting primarily of saturated hydrocarbons, oily solvents such as xylene, and paraffin waxes. Preferred rubbers non-exclusively include curable rubber, isoprene, silicone, polyurethane, neoprene, and fluoropolymer based rubbers, particularly fluoropolyether based rubbers. Of these, fluoropolymer based rubbers are preferred. Any conventional coating method may be used to encapsulate the fuel substance 14 with a micro-porous oil or rubber coating. For example, a fuel substance 14 may be mixed with an oil or rubber solution, a solvent and a curing agent to form a blend, which blend is warmed and stirred to a desired consistency, granulated, dried and optionally pelletized. Suitable solvents for forming an oil or rubber solution non-exclusively include ketones such as methyl ethyl ketone, methyl isobutyl ketone, ethers and esters. Suitable curing agents non-exclusively include organosilanes containing at least one isocyanate group. Such blends may be formed in a suitable vessel at a temperature of from about 0° C. to about 1000° C., more preferably from about 20° C. to about 500° C., and dried for from about 1 to about 24 hours. Useful granulation and pellet forming techniques are well known in the art. In addition to covering the surfaces of the fuel or fuel pellets, the oil substances used herein are also absorbed by the fuel substance, filling the pores of the fuel substance. Typically, to coat a pellet of the fuel substance the quantity of oil combined with the pellet is much larger than the amount necessary to coat the pellet. The amount of oil mixed with the pellet is approximately 0.5 grams/pellet. The amount of oil actually soaked into the pellet is approximately 0.01 gram to 0.1 gram, wherein the dimensions of a fuel pellet are approximately 1.25 cm in diameter and 0.95 cm in height.

Similar to the films described above, the porosity and thickness of the oil or rubber coating materials can be tailored to give a desired water vapor flux, while preventing liquid water penetration. In the preferred embodiment of the invention, the oil or rubber coating materials have a pore size of from about 0.001 μm to about 1 μm, more preferably from about 0.01 μm to about 0.5 μm, and most preferably from about 0.05 μm to about 0.1 μm. Further, in the preferred embodiment of the invention, the oil or rubber coating materials have a thickness of from about 0.01 μm to about 10 μm, more preferably from about 0.05 μm to about 5 μm, and most preferably from about 0.1 μm to about 1 μm. In addition, high viscosity oils, such as high molecular weight hydrocarbons, reduce the rate of reaction between the fuel substances and water more than low viscosity oils. In the preferred embodiments of the invention, an oil has a preferred viscosity of from about 0.001 Pascal-second (Pa-sec) to about 100, more preferably from about 0.01 Pa-sec to about 10 Pa-sec and most preferably from about 0.1 Pa-sec to about 1 Pa-sec.

As discussed herein, the present invention provide a method in which the rate of reaction between water molecules and a water reactive chemical fuel can be regulated independently of the apparatus containing the chemical fuel. In the preferred embodiments of the invention, the fuel reaction rate, e.g. for $LiAlH_4$ fuel, is preferably from about $1 E^{-10}$ to $1 E^{-2}$ grams of fuel/second, more preferably from about $1 E^{-7}$ to about $1 E^{-3}$ grams/second, and most preferably from about $1 E^{-6}$ to $1 E^{-4}$ grams/second. Such fuel reaction rates are capable of generating quantities of hydrogen gas sufficient to produce from about 1 uW to about 100 W of electrical power, depending on the desired generator structure and application.

While the encapsulated fuels 10 of the invention are particularly well suited for use in a power generator apparatus 20 as illustrated in FIG. 1, the encapsulated fuels 10 may be used with virtually any type of power generator device that is designed to utilize in-situ generated hydrogen gas. As stated above, the encapsulated fuels 10 of the invention have been found to significantly improve the stability of such power generators if they are damaged and the fuel substance 14 is exposed to large quantities of liquid water. In addition, the encapsulated fuels 10 of the invention may be effectively employed in myriad other non-power generator related applications in which the generation of hydrogen gas is desired, serving as a stabilized, water-reactive fuel source.

The following examples serve to illustrate the invention:

Example 1

Fifty grams of fine lithium aluminum hydride ($LiAlH_4$) powder is mixed in 100 ml hexane and approximately 0.1 grams of a curable rubber solution. The curable rubber solution includes a curing agent. The mixture is warmed in a hood to 500° C. and stirred. The mixture is stirred continuously as it is warmed, until the entire mixtures has a soft, rubbery consistency. The soft mass is removed from the hood and granulated over a 400 mesh sieve. The granules are collected and dried at approximately 600° C. in an air oven in a hood for approximately 8 hours. The dried granules are pelletized in a press and ready for use.

Example 2

$LiAlH_4$ in pellet form is mixed with 0.5 g of mineral oil. The mixture is placed in vacuum chamber for about 1 hour to draw the oil into the pellet and to remove any gas from the pellet. The mixture is then removed from the vacuum and the $LiAlH_4$ is separated from the mineral oil by filtration, thereby preparing the coated $LiAlH_4$ for use in a power generator. The quantity of oil that is "mixed" with the pellet is much larger than the amount necessary to coat the pellet. The amount of oil soaked into the pellet is about 0.05 gram.

Example 3

$LiAlH_4$ in pellet form is sealed with an adhesive epoxy inside of a package constructed from a water vapor permeable, liquid water impermeable Gore-Tex® membrane. The package containing the $LiAlH_4$ is shaped such that it conforms to the shape of the fuel chamber of a power generator. The package is placed into a power generator and ready for use.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An electrical power generator comprising:
    a) a housing;
    b) at least one fuel cell mounted within the housing, the fuel cell comprising a cathode, an anode and a water vapor permeable electrolytic membrane positioned between the cathode and the anode; which fuel cell is capable of generating electricity and fuel cell water at the cathode by the reaction of hydrogen gas and oxygen gas; c) at least one fuel chamber mounted within the housing, which fuel chamber contains an encapsulated fuel including a solid, water vapor reactive encapsulated hydride fuel surrounded by and in contact with one or more micro-porous water vapor permeable, liquid water impermeable layers; d) at least one air inlet for admitting atmospheric air into the housing; e) a water retention zone within the housing extending from the air inlet to the fuel cell cathode, which water retention zone deters the diffusion of generated fuel cell water out of the air inlet; and f) a cavity within the housing extending from the fuel cell to the fuel chamber, which admits a flow of hydrogen gas from the fuel chamber to the fuel cell, and which admits a flow of water vapor from the fuel cell to the fuel chamber g) wherein the electrical power generator is water-less except for water that is generated by the fuel cell and water molecules present in the atmosphere outside of the power generator, and there is no incorporated or connected water supply, water chamber, or water reservoir, to provide water for reaction with the fuel substance.

2. The electrical power generator of claim 1, wherein said one or more micro-porous water vapor permeable, liquid water impermeable layers comprises a fluoropolymer containing material.

3. The electrical power generator of claim 1, wherein said one or more micro-porous water vapor permeable, liquid water impermeable layers comprises polytetrafluoroethylene.

4. The electrical power generator of claim 1, wherein said one or more micro-porous water vapor permeable, liquid water impermeable layers comprises a multilayer coating which coating comprises a fluoropolymer containing material.

5. The electrical power generator of claim 1, wherein said one or more micro-porous water vapor permeable, liquid water impermeable layers comprises a micro-porous water vapor permeable, liquid water impermeable oil.

6. The electrical power generator of claim 1, wherein said one or more micro-porous water vapor permeable, liquid water impermeable layers comprises a micro-porous water vapor permeable, liquid water impermeable rubber.

7. The electrical power generator of claim 1, wherein said solid, water vapor reactive encapsulated hydride fuel is in the form of a pellet.

8. The electrical power generator of claim 1, wherein said solid, water vapor reactive encapsulated hydride fuel is in the form of granules.

9. The electrical power generator of claim 1, wherein said solid, water vapor reactive encapsulated hydride fuel is in the form of a powder.

10. The electrical power generator of claim 1, wherein said solid, water vapor reactive encapsulated hydride fuel comprises lithium aluminum hydride.

11. The electrical power generator of claim 1, wherein said solid, water vapor reactive hydride fuel releases hydrogen gas when contacted by water vapor.

12. The electrical power generator of claim 1, wherein said more micro-porous water vapor permeable, liquid water impermeable layers have a thickness of from about 0.1 μm to about 100 μm.

13. The electrical power generator of claim 1, wherein said more micro-porous water vapor permeable, liquid water impermeable layers have a thickness of from about 1 μm to about 5 μm.

* * * * *